(12) United States Patent
Kammauff et al.

(10) Patent No.: US 11,891,479 B2
(45) Date of Patent: *Feb. 6, 2024

(54) THERMOFORMED PACKAGING AND METHODS OF FORMING THE SAME

(71) Applicant: KLÖCKNER PENTAPLAST OF AMERICA, INC., Gordonsville, VA (US)

(72) Inventors: Wade Jackson Kammauff, Charlottesville, VA (US); Seth Thomas Stewart, Charlottesville, VA (US); Carlos Daniel Stagnaro, Charlottesville, VA (US)

(73) Assignee: KLÖCKNER PENTAPLAST OF AMERICA, INC., Gordonsville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,238

(22) Filed: Feb. 13, 2023

(65) Prior Publication Data
US 2023/0183422 A1   Jun. 15, 2023

Related U.S. Application Data

(63) Continuation of application No. 17/528,980, filed on Nov. 17, 2021, now Pat. No. 11,603,432.
(Continued)

(51) Int. Cl.
C08G 63/672      (2006.01)
B29C 48/08       (2019.01)
(Continued)

(52) U.S. Cl.
CPC ............ *C08G 63/672* (2013.01); *B29C 33/42* (2013.01); *B29C 48/08* (2019.02); *B29C 48/18* (2019.02);
(Continued)

(58) Field of Classification Search
CPC ........ B29K 2105/256; B29K 2067/003; C08G 63/672; C08G 63/183; C08G 63/553;
(Continued)

(56) References Cited

U.S. PATENT DOCUMENTS 4,681,723 A    7/1987  Jester
4,883,694 A    11/1989 Ramalingam
(Continued)

FOREIGN PATENT DOCUMENTS

CN    102199338 B    12/2012
CN    205060393 U    3/2016
(Continued)

OTHER PUBLICATIONS

International Search Report and Written Opinion for International Patent Application No. PCT/US2023/013597 dated May 19, 2023, 15 pages.
(Continued)

*Primary Examiner* — Vishal V Vasisth
(74) *Attorney, Agent, or Firm* — GOODWIN PROCTER LLP (57) ABSTRACT

In various aspects, the present disclosure pertains to thermoformed webs that comprise polymer films having one or more thermoformed cavities contained therein, the polymer films comprising a polymer blend of amorphous polyethylene terephthalate (APET) and a copolyester that comprises (a) dicarboxylic acid residues (e.g., dicarboxylic acid residues that comprise terephthalic acid residues and, optionally, one or more additional dicarboxylic acid residues) and (b) diol residues (e.g., diol residues comprising ethylene glycol residues and, optionally, one or more additional diol monomer residues). Other aspects of the disclosure pertain to methods of forming such thermoformed webs, packaged
(Continued)

products comprising such thermoformed webs, and methods of recycling such thermoformed webs.

21 Claims, 4 Drawing Sheets

Related U.S. Application Data (60) Provisional application No. 63/115,297, filed on Nov. 18, 2020.

(51) Int. Cl.
| | | |
|---|---|---|
| *B29C 48/18* | (2019.01) | |
| *B29C 33/42* | (2006.01) | |
| *C08G 63/183* | (2006.01) | |
| *C08G 63/553* | (2006.01) | |
| *B29K 67/00* | (2006.01) | |
| *B29K 105/00* | (2006.01) | |
| *B29L 31/00* | (2006.01) | |

(52) U.S. Cl.
CPC ......... *C08G 63/183* (2013.01); *C08G 63/553* (2013.01); *B29K 2067/003* (2013.01); *B29K 2105/256* (2013.01); *B29L 2031/7164* (2013.01)

(58) Field of Classification Search
CPC ....... B29C 51/14; B29C 51/002; B29C 48/18; B29C 51/02; B29C 51/30; B29C 33/42; B29C 48/08
See application file for complete search history.

(56) References Cited

U.S. PATENT DOCUMENTS

| | | |
|---|---|---|
| 5,218,049 A | 6/1993 | Yamamoto et al. |
| 5,532,058 A | 7/1996 | Rolando et al. |
| 5,686,081 A | 11/1997 | Ono et al. |
| 5,783,273 A | 7/1998 | Yamamoto et al. |
| 5,874,035 A | 2/1999 | Tsai et al. |
| 5,912,070 A | 6/1999 | Miharu et al. |
| 5,968,663 A | 10/1999 | Muggli |
| 5,972,445 A | 10/1999 | Kimura et al. |
| 5,991,047 A | 11/1999 | Kohlert et al. |
| 6,099,682 A | 8/2000 | Krampe et al. |
| 6,113,927 A | 9/2000 | Hatakeyama |
| 6,218,024 B1 | 4/2001 | Tamber et al. |
| 6,306,503 B1 | 10/2001 | Tsai |
| 6,475,420 B1 | 11/2002 | Numrich et al. |
| 6,589,642 B1 | 7/2003 | Miller et al. |
| 6,592,978 B1 | 7/2003 | Miller et al. |
| 6,749,940 B1 | 6/2004 | Terasaki et al. |
| 7,000,769 B2 | 2/2006 | Killinger |
| 7,238,411 B2 | 7/2007 | Yoshida et al. |
| 7,763,265 B2 | 7/2010 | Buchanan et al. |
| 7,829,633 B2 | 11/2010 | Heukelbach et al. |
| 8,541,073 B2 | 9/2013 | Kendig et al. |
| 8,893,883 B2 | 11/2014 | Valaie et al. |
| 9,127,122 B2 | 9/2015 | Pearcy et al. |
| 9,598,519 B2 | 3/2017 | Choi et al. |
| 9,694,959 B2 | 7/2017 | Priscal et al. |
| 9,937,099 B2 | 4/2018 | Weikart et al. |
| 9,962,913 B2 | 5/2018 | Osborn et al. |
| 10,131,122 B2 | 11/2018 | Sargeant et al. |
| 10,385,183 B2 | 8/2019 | Maille |
| 10,618,257 B2 | 4/2020 | Suzuki et al. |
| 10,639,873 B1 | 5/2020 | Murga et al. |
| 11,541,646 B2 | 1/2023 | Mitchell et al. |
| 2002/0104773 A1 | 8/2002 | Kalvelage et al. |
| 2003/0017326 A1 | 1/2003 | McGurran et al. |
| 2003/0060589 A1 | 3/2003 | Shimizu et al. |
| 2003/0099813 A1 | 5/2003 | Bekele |
| 2003/0188826 A1 | 10/2003 | Miller |
| 2003/0203141 A1 | 10/2003 | Blum et al. |
| 2004/0197567 A1 | 10/2004 | Tsai et al. |
| 2005/0017013 A1 | 1/2005 | Peisach et al. |
| 2005/0136202 A1 | 6/2005 | Kendig |
| 2005/0139505 A1 | 6/2005 | Miller et al. |
| 2005/0245677 A1 | 11/2005 | Tsukamoto |
| 2006/0020084 A1 | 1/2006 | Heukelbach et al. |
| 2006/0040076 A1 | 2/2006 | Franzyshen et al. |
| 2006/0081495 A1 | 4/2006 | Killinger |
| 2006/0121392 A1 | 6/2006 | Nakatsugawa |
| 2006/0222845 A1 | 10/2006 | Deng et al. |
| 2006/0283758 A1 | 12/2006 | Pasbrig |
| 2006/0287479 A1 | 12/2006 | Crawford et al. |
| 2007/0068842 A1 | 3/2007 | Pasbrig |
| 2007/0212539 A1 | 9/2007 | Yamada et al. |
| 2007/0284280 A1 | 12/2007 | Young |
| 2008/0058495 A1 | 3/2008 | Quillen et al. |
| 2008/0090090 A1 | 4/2008 | Munster et al. |
| 2008/0158490 A1 | 7/2008 | Nakayama et al. |
| 2008/0261050 A1 | 10/2008 | Hartzel et al. |
| 2008/0269701 A1 | 10/2008 | Dircks et al. |
| 2009/0208718 A1 | 8/2009 | Stoll et al. |
| 2009/0227735 A1 | 9/2009 | Shih et al. |
| 2010/0052202 A1 | 3/2010 | Otto et al. |
| 2010/0189942 A1 | 7/2010 | Tamura et al. |
| 2011/0049003 A1 | 3/2011 | Bellamah et al. |
| 2011/0073901 A1 | 3/2011 | Fujita et al. |
| 2011/0210037 A1 | 9/2011 | Muenster et al. |
| 2013/0217830 A1 | 8/2013 | Crawford et al. |
| 2015/0225151 A1 | 8/2015 | Osborn et al. |
| 2015/0353692 A1 | 12/2015 | Bhattacharjee et al. |
| 2019/0129078 A1 | 5/2019 | Won et al. |
| 2019/0366616 A1 | 12/2019 | Berny et al. |
| 2020/0079064 A1* | 3/2020 | Peiffer ..................... B29D 7/01 |
| 2021/0394468 A1 | 12/2021 | Allen et al. |
| 2021/0395446 A1 | 12/2021 | Peters et al. |
| 2022/0106468 A1 | 4/2022 | Wang et al. |
| 2022/0106469 A1 | 4/2022 | Wang et al. |
| 2022/0348715 A1 | 11/2022 | Peters et al. |
| 2022/0363822 A1 | 11/2022 | Peters et al. |
| 2022/0388749 A1 | 12/2022 | Landeghem |

FOREIGN PATENT DOCUMENTS

| | | |
|---|---|---|
| EP | 0239100 A2 | 9/1987 |
| EP | 1418042 A1 | 5/2004 |
| EP | 1655237 A1 | 5/2006 |
| EP | 1709116 B1 | 10/2006 |
| EP | 2033775 A1 | 3/2009 |
| EP | 2178701 B1 | 9/2011 |
| EP | 2365025 A1 | 9/2011 |
| EP | 2393658 B1 | 12/2011 |
| EP | 3152129 A1 | 4/2017 |
| EP | 3453734 A1 | 3/2019 |
| EP | 3808680 A1 | 4/2021 |
| EP | 4011621 A1 | 6/2022 |
| JP | S62294548 A | 12/1987 |
| JP | S63251234 A | 10/1988 |
| JP | H01110953 A | 4/1989 |
| JP | H02116546 A | 5/1990 |
| JP | 2000255642 A | 9/2000 |
| JP | 3140252 B2 | 3/2001 |
| JP | 2002234571 A | 8/2002 |
| JP | 2004530164 A | 9/2004 |
| JP | 2005199673 A | 7/2005 |
| JP | 2005523188 A | 8/2005 |
| JP | 2006523581 A | 10/2006 |
| JP | 2006313303 A | 11/2006 |
| JP | 2007314752 A | 12/2007 |
| JP | 2008026881 A | 2/2008 |
| JP | 2008030332 A | 2/2008 |
| JP | 2009513792 A | 4/2009 |
| JP | 2009286920 A | 12/2009 |
| JP | 2009545343 A | 12/2009 |
| JP | 4754181 B2 | 8/2011 |
| JP | 2012517359 A | 8/2012 |
| JP | 2013503760 A | 2/2013 |
| JP | 5745520 B2 | 7/2015 |
| JP | 2016020419 A | 2/2016 |

(56) References Cited

FOREIGN PATENT DOCUMENTS

| JP | 2019086771 | A  | 6/2019  |
|----|------------|----|---------|
| KR | 100922490  | B1 | 10/2009 |
| KR | 101495211  | B1 | 2/2015  |
| KR | 101891351  | B1 | 9/2018  |
| WO | 2002098959 | A1 | 12/2002 |
| WO | 2005003235 | A1 | 1/2005  |
| WO | 2007001573 | A1 | 1/2007  |
| WO | 2007104513 | A1 | 9/2007  |
| WO | 2008014862 | A1 | 2/2008  |
| WO | 2008033404 | A1 | 3/2008  |
| WO | 2008148176 | A1 | 12/2008 |
| WO | 2010090893 | A1 | 8/2010  |
| WO | 2012037087 | A1 | 3/2012  |
| WO | 2012037180 | A1 | 3/2012  |
| WO | 2013116445 | A1 | 8/2013  |
| WO | 2015187174 | A1 | 12/2015 |
| WO | 2019089535 | A2 | 5/2019  |
| WO | 2020076747 | A1 | 4/2020  |
| WO | 2020076749 | A1 | 4/2020  |
| WO | 2021080779 | A1 | 4/2021  |

OTHER PUBLICATIONS

Reichert et al., "Bio-Based Packaging: Materials, Modifications, Industrial Applications and Sustainability", Polymers, [Online] vol. 12, No. 7, Jul. 14, 2020; Retrieved from Internet URL <https://www.ncbi.nlm.nih.gov/pmc/articles/PMC7407213/>; Retrieved on May 15, 2023, 47 pages.

International Search Report and Written Opinion for International Patent Application No. PCT/US2021/059723 dated Mar. 24, 2022, 11 pages.

Eastman Product Data Sheet, Developmental Copolyester D41991 Ex-1770-70-20 Natural, no date given, 3 pages.

Eastman Safety Data Sheet, Eastman(TM) Developmental Polymer D41991 Version 1.0, Revision date: Oct. 30, 2020, 10 pages.

Eastman, Eastman Tritan(TM) Copolyester MP100 Product Regulatory Information Sheet, Print Date: Mar. 3, 2021, Version: Mar. 2, 2021 (00,001.00,052), 8 pages.

International Search Report and Written Opinion for International Patent Application No. PCT/US2022/031641, dated Aug. 19, 2022, 14 pages.

Topas: "Cyclic Olefin Copolymer (COC)", Topas Advances Polymers—Brochure, Jan. 1, 2011, pp. 1-32, Retrieved from the Internet: URL: www.polyplastics.com, [retrieved on Apr. 15, 2019].

www.Topas.Com: "TOPAS Packaging", Apr. 1, 2011, pp. 1-32, Retrieved from the Internet: URL: https://topas.com/sites/default/files/files/Packaging_E_2014-06.pdf, [retrieved on Nov. 14, 2018].

TOPAS Advanced Polymers: "TOPAS Packaging", Conference Proceedings Article, Apr. 1, 2011, 32 pages.

International Search Report and Written Opinion for International Patent Application No. PCT/EP2009/007844, dated Feb. 17, 2010, 13 pages.

International Search Report and Written Opinion for International Patent Application No. PCT/US10/055498, dated Jul. 25, 2011, 6 pages.

International Search Report and Written Opinion for International Patent Application No. PCT/US2017/046910, dated Nov. 24, 2017, 13 pages.

International Search Report and Written Opinion for International Application No. PCT/EP2019/063231, dated Sep. 18, 2019, 11 pages.

\* cited by examiner

THERMOFORMED PACKAGING AND METHODS OF FORMING THE SAME

CROSS-REFERENCE TO RELATED APPLICATIONS

This application is a continuation of U.S. patent application Ser. No. 17/528,980, now U.S. Pat. No. 11,603,432 filed Nov. 17, 2021, which claims the benefit of U.S. provisional patent application No. 63/115,297, filed Nov. 18, 2020, entitled "THERMOFORMED PACKAGING AND METHODS OF FORMING THE SAME," the entire contents of each of which are incorporated by reference herein.

BACKGROUND OF THE INVENTION

Thermoformed packaging is commonly used for the packaging of consumable products including pharmaceuticals, food products, and chewing gum, as well as medical devices, among others. Blister packaging is a particular form of thermoformed packaging that serves important societal needs. For example, blister packaging is particularly useful for pharmaceuticals because it ensures a sterile environment for each dose and helps protect the packaged drugs from degradation and physical damage which improves the efficacy of the drugs. Blister packaging can also keep multiple dose forms from adhering to one another and is aesthetically pleasing. The format of the blister package, where dosage forms can be individually packaged and are visible, further provides a psychological benefit, as studies have shown that patients comply with prescription instructions better and complete their prescribed dose when the dosage forms are packaged in blisters as opposed to being placed in vials. Thermoformed packaging is useful for medical devices because it ensures a sterile environment for the medical device(s) that are packaged therein, helps protect the packaged medical device(s) from physical damage, protects against environmental hazards, and provides a convenient kit format to assist in organizing the medical procedure being performed.

Moreover, as the consumption of plastic increases worldwide the ability to recycle packaging is also a societal need and conventional blister packages do not fulfill this requirement. Blister packaging and medical device packaging are mature technologies that have traditionally used polyvinyl chloride (PVC) film and its various laminates. Films comprising PVC, known as "mono PVC films," are widely used today and account for more than 50% of the pharmaceutical blister packages and a significant percentage of the medical device packages in the world. PVC-based films are easily thermoformed, have a sharp softening point, can be made with low residual shrinkage, and cut easily. Blister and medical device packaging machines were designed specifically for these attributes. Thus, the large infrastructure of machines which exists today are suitable for films with PVC-like performance attributes. Although PVC is recyclable, there is no widespread infrastructure in place to collect, separate, and mechanically recycle PVC packages. In the standard plastic waste stream, PVC articles generally end up incinerated or landfilled.

There is a need for a non-PVC film which can run on existing machine lines. There is also a need for non-PVC film which can be recycled in traditional mechanical recycling streams. One such recycling stream, known as ASTM International Resin Identification Coding System (RIC) stream #1 (RIC 1), applies to products that contain amorphous polyethylene terephthalate (APET). However, standard or neat APET films are not ideal for use in pharmaceutical blister packages and medical device packages, especially those films developed for supported web machines.

SUMMARY OF THE INVENTION

In various aspects, the present disclosure pertains to thermoformed webs that comprise a polymer film, the thermoformed webs having one or more thermoformed cavities contained therein.

In some embodiments, the polymer film comprises a polymer blend of amorphous polyethylene terephthalate (APET) and a copolyester that comprises (a) dicarboxylic acid residues (e.g., dicarboxylic acid residues that comprise terephthalic acid residues and, optionally, one or more additional dicarboxylic acid residues) and (b) diol residues (e.g., diol residues comprising ethylene glycol residues and, optionally, one or more additional diol monomer residues).

In some embodiments, the polymer film comprises a polymer blend of amorphous polyethylene terephthalate (APET) and a copolyester that comprises (a) dicarboxylic acid residues comprising polyethylene terephthalate residues and (b) diol residues comprising (i) ethylene glycol residues and (ii) one or more additional diol monomer residues.

In some embodiments, the polymer film comprises a polymer blend of 50 wt % to 95 wt % of amorphous polyethylene terephthalate (APET) and 5 wt % to 50 wt % of a copolyester that comprises (a) dicarboxylic acid residues (e.g., dicarboxylic acid residues that comprise terephthalic acid residues and, optionally, one or more additional dicarboxylic acid residues) and (b) diol residues (e.g., diol residues comprising ethylene glycol residues and, optionally, one or more additional diol monomer residues, for example, one or more additional diol monomer residues selected from neopentyl glycol residues, 1,4-cyclohexanedimethanol residues, or diethylene glycol residues).

In some embodiments, the polymer film comprises a polymer blend of 50 wt % to 95 wt % of amorphous polyethylene terephthalate (APET) and 5 wt % to 50 wt % of a copolyester that comprises (a) dicarboxylic acid residues comprising polyethylene terephthalate residues and (b) diol residues comprising (i) ethylene glycol residues and (ii) one or more additional diol monomer residues selected from neopentyl glycol residues, 1,4-cyclohexanedimethanol residues, or diethylene glycol residues.

In some embodiments, which can be used in conjunction with the above aspects and embodiments, the dicarboxylic acid residues comprise 70 mol % or more of terephthalic acid residues.

In some embodiments, which can be used in conjunction with the above aspects and embodiments, diol residues comprise 70 mol % or more of ethylene glycol residues.

In some embodiments, which can be used in conjunction with the above aspects and embodiments, the diol residues comprise up to 30 mol % of the additional diol residues.

In some embodiments, which can be used in conjunction with the above aspects and embodiments, the polymer film has a crystallization time of at least 2.5 minutes, beneficially between 2.5 and 60 minutes, for example, ranging anywhere from 2.5 minutes to 5 minutes to 10 minutes to 15 minutes to 20 minutes to 30 minutes to 60 minutes (in other words, ranging between any two of the preceding values), for example, between 3 and 30 minutes, at an isothermal crystallization temperature of 120° C. as measured by DSC.

In some embodiments, which can be used in conjunction with the above aspects and embodiments, the polymer film has a crystallization time of at least 2.5 minutes at an isothermal crystallization temperature of 120° C. but not more than 30 minutes at an isothermal crystallization temperature of 165° C. as measured by DSC.

In some embodiments, which can be used in conjunction with the above aspects and embodiments, the copolyester and the APET are miscible and the blend is homogeneous.

In some embodiments, which can be used in conjunction with the above aspects and embodiments, the polymeric film comprises a core layer disposed between two outer skin layers, wherein the core layer and the skin layers contain the polymer blend and wherein from 0.05 to 10 wt % of inorganic particles are further added to the skin layers.

In some embodiments, which can be used in conjunction with the above aspects and embodiments, the polymer film has a melting point ranging from 225 to 255° C.

In some embodiments, which can be used in conjunction with the above aspects and embodiments, polymer film has a glass transition temperature ranging from 65 to 90° C. as measured by DSC.

In some embodiments, which can be used in conjunction with the above aspects and embodiments, the polymer film ranges from 25 microns to 2000 microns in thickness.

In some embodiments, which can be used in conjunction with the above aspects and embodiments, the polymer film has an elongation at break ranging from 200 to 350% as measured by ASTM D-638.

In some embodiments, which can be used in conjunction with the above aspects and embodiments, the polymer film is formed by extruding the polymer blend in a sheet having one or more layers. In some of these embodiments, the copolyester and the APET are compounded via a process selected from co-rotating twin screw extrusion, counter-rotating twin screw extrusion, and planetary extrusion.

In some embodiments, which can be used in conjunction with the above aspects and embodiments, polymer film is a blown film, a cast film or a co-extruded film.

In some embodiments, which can be used in conjunction with the above aspects and embodiments, wherein the polymer film is a calendared polymer film.

In some embodiments, which can be used in conjunction with the above aspects and embodiments, the thermoformed web may meet the clumping criteria set forth in Association of Plastics Recyclers (APR) PET Flake Clumping Evaluation (Document Code PET-S-08). This test method requires the APR Granulating PET Articles to Flake (Document Code PET-P-03) and Washing and Sink/Float Separation of PET Flake (Document Code PET-P-04) to be followed to prepare the material for the clumping test. The first portion of the Clumping Evaluation dictates a crystallization step at 165° C. for 30 minutes analyzing 1.5 kg of material in an oven safe open container (outlined as 22 cm by 33 cm). The sample is then removed and allowed to cool to room temperature. Any material clumps in the test sample can be broken up using light hand pressure. The sample is then ready for the clumping evaluation. There are two versions, a low pressure evaluation and an evaluation under load. All testing referenced in this document represents the low pressure evaluation. An oven is heated to 210° C. and 1 kg of sample from the crystallization step is placed in an oven safe open container (e.g., 22 cm by 33 cm) which is lined with foil. The material is heated in the oven for 90 minutes and removed from the oven and allowed to cool to room temperature undisturbed. The material is then transferred to a 12.5 mm sieve and the sieve may be shaken by hand. Any flakes that do not pass through the sieve will be weighed and recorded. Likewise, any material stuck to the foil will be weighed and recorded. The agglomerated materials and the material on the foil must not be more than 1% of the total weight of the sample (e.g. for a 1 kg sample, only 10 g of combined material may not pass through the sieve and be attached to the foil).

In some embodiments, which can be used in conjunction with the above aspects and embodiments, the thermoformed web may meet all criteria specified by the Association of Plastics Recyclers (APR) Critical Guidance Protocol for Clear PET Resin and Molded Articles (APR Protocol PET-CG-01).

In some embodiments, which can be used in conjunction with the above aspects and embodiments, the thermoformed web may meet one or more criteria specified by the Association of Plastics Recyclers (APR) Critical Guidance Protocol for Clear PET Resin and Molded Articles (APR Protocol PET-CG-01) including one or more of the following evaluations: PET Flake Clump Screening (PET-S-08), IV Build Screening (PET-S-07), and Plaque Color Screening (PET-S-09).

In various aspects, the present disclosure pertains to methods of forming thermoformed webs in accordance with the above aspects and embodiments, which methods comprise heating the polymer film to a temperature whereby a softened polymer film is formed and forcing the softened polymer film into one or more mold cavities of a mold.

In some embodiments, the polymer film is heated to a temperature ranging from 70 to 150° C. throughout during the thermoforming process.

In some embodiments, which can be used in conjunction with the above aspects and embodiments, the thermoformed web is formed on an unsupported web machine, and the polymer film has a maximum shrinkage during processing in a range of +/−5% in any direction In some embodiments, which can be used in conjunction with the above aspects and embodiments, the thermoformed web is formed on a supported web machine, and the polymer film has a maximum shrinkage during processing in a range of +/−8%.

In various aspects, the present disclosure pertains to packaged products comprising (a) a thermoformed web in accordance with the above aspects and embodiments, (b) lidding applied to the thermoformed web, and (c) one or more products positioned in the one or more thermoformed cavities and between the lidding and the thermoformed web.

In some embodiments, the one or more products are consumable products. In some of these embodiments, a thickness of the film ranges from 100 to 550 microns. In some of these embodiments, the lidding comprises a rupturable layer and a burst resistant layer that can be removed from the rupturable layer, a rupturable layer that can be opened by pressure on an opposite side of the packaged product, or a peelable layer that can be removed from the thermoformed web giving access to the one or more products.

In some embodiments, the one or more products comprise a medical device. In some of these embodiments, a thickness of the film ranges from 200 to 2000 microns. In some of these embodiments, the lidding comprises a polymer and/or paper.

In various aspects, the present disclosure pertains to processes of forming a packaged product in accordance with any of above aspects embodiments, which comprise (a) positioning the one or more products in the one or more thermoformed cavities of the thermoformed web and (b)

sealing lidding to the thermoformed web thereby enclosing the one or more products in the one or more thermoformed cavities.

In some embodiments, the lidding is sealed to the thermoformed web at a machine sealing temperature ranging from 110 to 210° C.

In various aspects, the present disclosure pertains to methods of recycling that comprise (a) combining (i) polyethylene terephthalate flakes and/or pellets and (ii) flakes of a thermoformed web in accordance with any of the above aspects and embodiments and/or pellets formed from flakes of a thermoformed web in accordance with any of the above aspects and embodiments, thereby forming a mixture of flakes and/or pellets, and (b) crystallizing the mixture at elevated temperature to form a free-flowing crystallized mixture.

In some embodiments, the methods further comprise feeding the free-flowing crystallized mixture into polymer processing equipment to form a processed polymer product. In some embodiments, the processed polymer product is an extruded polymer product. In some embodiments, the processed polymer product is a calendared polymer product.

In various aspects, the present disclosure pertains to recycle streams comprising (a) recycled polyethylene terephthalate flakes and/or pellets and (b) recycled flakes of a thermoformed web in accordance with any of the above aspects and embodiments and/or pellets formed from flakes of a thermoformed web in accordance with any of the above aspects and embodiments.

DETAILED DESCRIPTION

Figure 1:
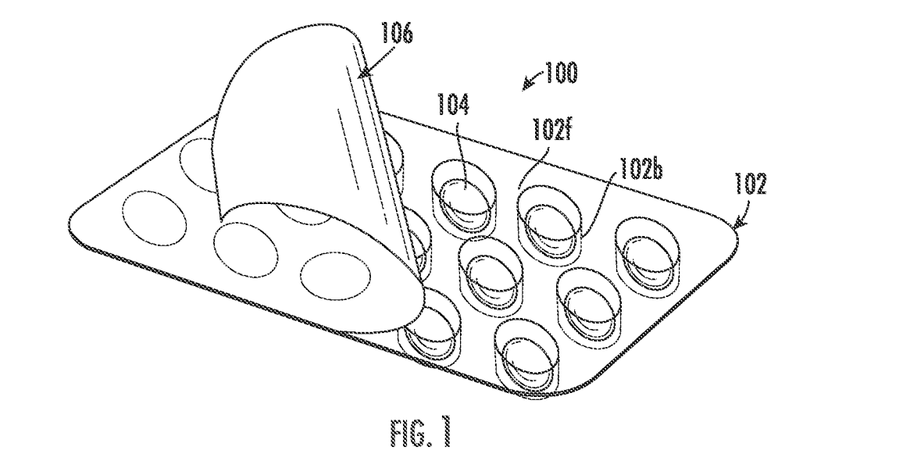
FIG. 1 is a schematic illustration of a blister package that includes a thermoformed web containing an array of thermoformed cavities, known as blisters, which contain a consumable product of interest, in accordance with an embodiment of the present disclosure.

With reference now to FIG. 1, a blister package 100 typically includes a polymer film 102 containing an array of thermoformed cavities, known as blisters 102b, which contain a consumable product 104 of interest (e.g., pharmaceutical dosage forms, food products, tobacco products, cannabis products, chewing gums, etc.) and onto which a cover 106, also known as a lidding, is applied. The lidding 106 can be formed from one or more materials known in the art such as foils, polymer films and/or paper. The lidding 106 is generally scaled to the flat portion 102f of the polymer film 102 that remains as a sealing-area outside and between the blisters 102b, often with a heat seal lacquer.

During thermoforming, the polymer film 102 is heated to a softening temperature and blisters 102b of a given shape are thermoformed across the film. The resulting product (i.e., the polymer film 102 with blister cavities 102b formed therein), is also referred to herein as a thermoformed web.

Most blister packaging machines use heat and gas pressure (with or without plug assist) to form blisters in a polymer film obtained from a roll or in the form of a sheet. In a typical process, a polymer film is unwound from a roll and guided through the blister packaging machine. The polymer film 200 passes through contact heaters (or radiant heaters) to reach an elevated temperature such that the polymer film will soften and become pliable. The softened polymer film is then blown into cavities in a mold by using a pressurized gas (e.g., compressed air, etc.), with or without plug assist, which will form blisters in the polymer film, thus creating a thermoformed web. The mold is typically cooled such that the polymer film becomes sufficiently rigid so that the thermoformed web maintains its shape, allowing the thermoformed web to be removed from the mold. (Other processes are known as well, including processes in which blisters are formed by drawing the polymer film into cavities of a forming tool via a vacuum, after the polymer film is heated and softened, with or without plug assist.) Blister packaging machines are commonly unsupported web machines, meaning that the polymer film is pulled through the machine without the sides of the film being clamped, pinned, or otherwise supported. A filling device is then used to place the desired product into the blisters. Subsequently, a sealing station is used to seal the lidding onto the surface of the thermoformed web at a suitable temperature and pressure, which seals the desired product in the blisters. Polymer film thicknesses for processing into blister packaging machines typically range from 100 microns or less to 550 microns or more, for example ranging from 100 to 150 to 200 to 250 to 300 to 350 to 400 to 450 to 500 to 550 microns (in other words, ranging between any two of the preceding values).

Figure 2:
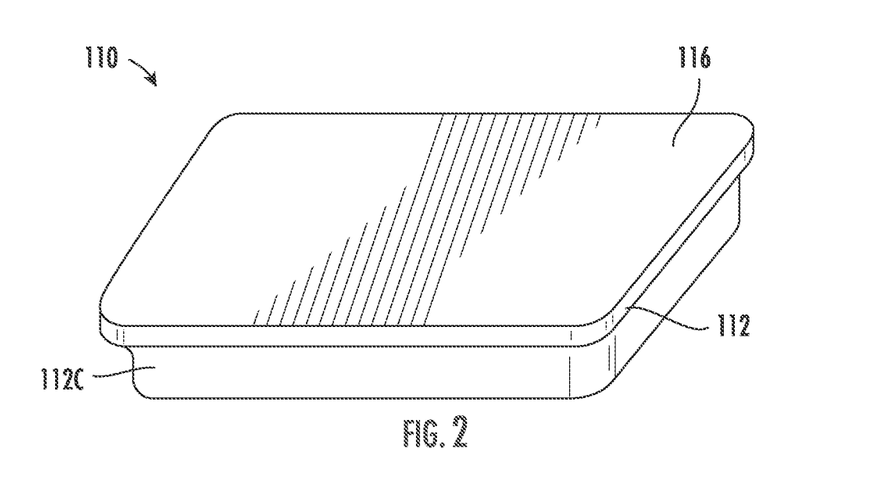
FIG. 2 is a schematic illustration of a medical device package that includes a thermoformed web containing one or more thermoformed cavities, which contain one or medical devices, in accordance with an embodiment of the present disclosure.

With reference now to FIG. 2, a medical device package 110 commonly includes a polymer film 112 containing one or more thermoformed cavities 112c, which contain, for example, one or more medical devices, medical device components, and/or medical device accessories, and onto which a cover 116, also known as lidding is applied. The lidding 116 can be formed from one or more materials known in the medical device packaging art, for example, polymeric lidding materials such as TYVEK® (a spun bonded material formed from high-density polyethylene fibers, available from DuPont de Nemours, Inc., Wilmington DE, USA) and/or paper. The lidding 116 is generally scaled to the flat portion of the polymer film 112 that remains as a sealing-area outside the one or more thermoformed cavities 112c (as well as between the one or more thermoformed cavities 112c, in the event there are multiple cavities). Although not shown, the medical device package 110 may be enclosed and sealed within an outer foil pouch.

During thermoforming of medical device packaging, the polymer film 112 is heated to a softening temperature (e.g., with contact or radiant heaters) and one or more thermoformed cavities 112c of a given shape are thermoformed across the film. The resulting product (i.e., the polymer film 112 with one or more cavities 112c formed therein) is also referred to herein as a thermoformed web.

In a typical process, a polymer film is unwound from a roll and guided through a medical device packaging machine. The polymer film is heated to reach an elevated temperature such that the polymer film will soften and become pliable. The softened polymer film is then blown or drawn into cavities in a mold by using a pressurized gas (e.g., compressed air, etc.) or vacuum, with or without plug assist, which will form one or more cavities in the polymer film, thus creating a thermoformed web. The mold is typically cooled such that the polymer film becomes sufficiently rigid so that the thermoformed web maintains its shape, allowing the thermoformed web to be removed from the mold. Medical device packaging machines are commonly supported web machines, meaning that the sides of the polymer film are supported at points during the process, for example, with clamps or pins or other supports. One or more medical devices, medical device components, and/or medical device accessories, are then placed into the one or more cavities. Subsequently, a sealing station is used to seal the lidding onto the surface of the thermoformed web at a suitable temperature and pressure, which seals the desired product in the cavities. Polymer film thicknesses for processing into medical device packaging machines typically range from 200 microns or less to 1800 microns or more, for example, ranging from 200 to 400 to 600 to 800 to 1000 to 1200 to 1400 microns.

Food packaging, consumer product packaging, and other thermoformed articles, like medical device packaging, are commonly performed on a supported web machine. Heating may be performed, for example, using radiant heat.

The present disclosure pertains to thermoformed webs that comprise a polymer film having one or more thermoformed cavities contained therein, wherein the polymer film comprises a polymer blend of amorphous polyethylene terephthalate (APET) and a copolyester that comprises (a) dicarboxylic acid residues (e.g., dicarboxylic acid residues that comprise terephthalic acid residues and, optionally, one or more additional dicarboxylic acid residues) and (b) diol residues (e.g., diol residues comprising ethylene glycol residues and, optionally, one or more additional diol monomer residues).

In various embodiments, the polymer film comprises a polymer blend of amorphous polyethylene terephthalate (APET) and a copolyester that comprises (a) dicarboxylic acid residues comprising polyethylene terephthalate residues and (b) diol residues comprising (i) ethylene glycol residues and (ii) one or more additional diol monomer residues selected from neopentyl glycol residues, 1,4-cyclohexanedimethanol residues, diethylene glycol residues, or triethylene glycol residues.

In various embodiments, the polymer film comprises a polymer blend of 50 wt % to 95 wt % of amorphous polyethylene terephthalate (APET) and 5 wt % to 50 wt % of a copolyester that comprises (a) dicarboxylic acid residues (e.g., dicarboxylic acid residues that comprise terephthalic acid residues and, optionally, one or more additional dicarboxylic acid residues) and (b) diol residues (e.g., diol residues comprising ethylene glycol residues and, optionally, one or more additional diol monomer residues, for example, one or more additional diol monomer residues selected from neopentyl glycol residues, 1,4-cyclohexanedimethanol residues, or diethylene glycol residues).

In various embodiments, the polymer film will comprise a polymer blend of 50 wt % or less to 95 wt % or more of amorphous polyethylene terephthalate, for example, ranging from 50 wt % to 55 wt % to 60 wt % to 65 wt % to 70 wt % to 75 wt % to 80 wt % to 85 wt % to 87.5 wt % to 90 wt % to 92.5 wt % to 95 wt % amorphous polyethylene terephthalate, and 5 wt % or less to 50 wt % or more the copolyester, for example, ranging from 5 wt % to 7.5 wt % to 10 wt % to 12.5 wt % to 15 wt % to 20 wt % to 25 wt % to 30 wt % to 35 wt % to 40 wt % to 45 wt % to 50 wt % of the copolyester.

In various embodiments, the dicarboxylic acid residues of the copolyester will comprise 70 mol % or more of terephthalic acid residues. For example the dicarboxylic acid residues of the copolyester may comprise from 70 mol % to 75 mol % to 80 mol % to 85 mol % to 90 mol % to 95 or 97.5 mol % to 99 mol % to 100 mol % of terephthalic acid residues. In some embodiments, the dicarboxylic acid residues of the copolyester may further comprise 30 mol % or less of additional dicarboxylic acid residues selected from aromatic dicarboxylic acid residues (other than terephthalic acid residues), aliphatic dicarboxylic acid residues having up to 20 carbon atoms, or both. For example, the additional dicarboxylic acid residues of the copolyester may comprise from 30 mol % to 25 mol % to 20 mol % to 15 mol % to 5 mol % to 2.5 mol % to 1 mol % to 0 mol % of additional dicarboxylic acid residues. Specific examples of such additional dicarboxylic acid residues include isophthalic acid, biphenyldicarboxylic acid, naphthalenedicarboxylic acid, stilbenedicarboxylic acid, cyclohexanedicarboxylic, malonic acid, succinic acid, glutaric acid, adipic acid, pimelic acid, suberic acid, azelaic acid, and/or dodecanedioic dicarboxylic acid, among others.

In various embodiments the diol residues of the copolyester will comprise 70 mol % or more of ethylene glycol residues. For example the diol residues of the copolyester may comprise from 70 mol % to 75 mol % to 80 mol % to 85 mol % to 90 mol % to 95 mol % to 97.5 mol % to 99 mol % ethylene glycol residues. In various embodiments, the diol residues of the copolyester will comprise from 30 mol % or less of the additional diol residues. For example, the additional diol residues may comprise from 30 mol % to 25 mol % to 20 mol % to 15 mol % to 5 mol % to 2.5 mol % to 1 mol % of additional diol residues. In some embodiments, the additional diol residues of the copolyester may comprise 30 mol % or less of neopentyl glycol residues, for example, from 30 mol % to 25 mol % to 20 mol % to 15 mol % to 5 mol % to 2.5 mol % to 1 mol % to 0 mol % of neopentyl glycol residues. In some embodiments, the additional diol residues of the copolyester may comprise 30 mol % or less of 1,4-cyclohexanedimethanol residues, for example, from 30 mol % to 25 mol % to 20 mol % to 15 mol % to 5 mol % to 2.5 mol % to 1 mol % to 0 mol % of 1,4-cyclohexanedimethanol residues. In some embodiments, the additional diol residues may comprise 30 mol % or less of diethylene glycol residues, for example, from 30 mol % to 25 mol % to 20 mol % to 15 mol % to 5 mol % to 2.5 mol % to 1 mol % to 0 mol % of diethylene glycol residues. In some embodiments, the additional diol residues may comprise 30 mol % or less of triethylene glycol residues, for example, from 30 mol % to 25 mol % to 20 mol % to 15 mol % to 5 mol % to 2.5 mol % to 1 mol % to 0 mol % of triethylene glycol residues.

In various embodiments, APET and the copolyester are miscible and the blend is homogeneous.

In embodiments where the thermoformed web is used in blister packaging, the polymer film will typically range from 100 microns or less to 550 microns or more, for example ranging from 100 to 150 to 200 to 250 to 300 to 350 to 400 to 450 to 500 to 550 microns, in thickness.

In embodiments where the thermoformed web is used in medical device, food, and consumer product packaging, the polymer film will typically range from 200 microns or less to 1800 microns or more, for example, ranging from 200 to 400 to 600 to 800 to 100 to 1200 to 1400 microns, in thickness.

In various embodiments, the polymer film has a melting point ranging from 225 to 255° C. for example, ranging from 225° C. to 230° C. to 235° C. to 240° C. to 245° C. to 250° C. to 255° C.

In various embodiments, the polymer film has a glass transition temperature ranging from 65-90° C. as measured by DSC, for example, ranging from 65° C. to 70° C. to 75° C. to 80° C. to 90° C. to 95° C.

In various embodiments, the polymer film has crystallization temperature ranging from 130 to 160° C., for example, ranging from 130° C. to 135° C. to 140° C. to 145° C. to 150° C. to 155° C. to 160° C.

In some embodiments, the polymer film will further comprise pigments in an amount sufficient to give the film color. These include transparent colors such as transparent blue and transparent green colors. In some embodiments, additives are added to achieve a dark color with an L* value <40, from the CIELAB color space where L* denotes brightness from 0 (black) to 100 (white), and/or NIR (near infrared) reflectance <=10%.

In some embodiments, the polymer film will comprise a core layer of the polymer blend between two outer skin layers to which a small amount (e.g., from 0.05 to 10 wt %) of inorganic particles such as mineral particles are added to the blend, which will improve the ease at which layers of the thermoformed web can be separated from one another when stacked. Typically each skin layer will comprise between 2.5 to 20% of the overall fill thickness and the core layer will comprise between 60 to 95% of the overall fill thickness.

In some aspects, the present disclosure pertains to methods of forming a thermoformed web that has one or more thermoformed cavities contained therein. The thermoformed web is formed from a polymer film that comprises a blend of amorphous polyethylene terephthalate and a copolyester as detailed elsewhere herein. The methods comprise heating the polymer film to a temperature whereby a softened polymer film is formed, and forcing the softened film into one or more cavities in a mold (e.g., by blowing the softened film into the one or more cavities using positive pressure, by drawing the softened film into the one or more cavities using a vacuum, with or without plug assist, etc.), thereby forming the one or more cavities. The polymer film is then cooled and removed from the mold.

In some embodiments, the thermoforming temperature of the polymer film ranges from 70° C. to 150° C. (e.g., ranging from 70° C. to 80° C. to 90° C. to 100° C. to 110° C. to 120° C. to 130° C. to 140° C. to 150° C.), and preferably from 100 to 125° C. in certain embodiments.

In some embodiments, the polymer film is formed on an unsupported web machine and has a maximum shrinkage in any direction during processing in the range of +/-1%, +/-2%, +/-3%, +/-4%, or +/-5%. In some embodiments, the polymer film is formed on a supported web machine and has a maximum shrinkage in any direction during processing in the range of +/-1%, +/-2%, +/-3%, +/-4%, +/-5%, +/-6%, +/-7%, or +/-8%. As discussed below, the direction of greatest shrinkage is typically the direction transverse to the unwind, or machine, direction of the film.

In some aspects, the present disclosure pertains to processes for forming a polymer film that can subsequently be used to create a thermoformed web that has one or more thermoformed cavities. The processes may comprise drying pieces (e.g., flakes and/or pellets) of an amorphous polyethylene terephthalate and of a copolyester as detailed elsewhere herein until the residual moisture level is below 100 ppm (preferably as low as possible), and extruding a mixture of the amorphous polyethylene terephthalate and the copolyester to form a polymer film. In some embodiments, the polymer film is calendared.

In some embodiments, the amorphous polyethylene terephthalate is dried at a temperature ranging from 120 to 140° C. for a period ranging from 8 to 12 hours and the copolyester is dried at a temperature ranging from 60 to 72° C. for a period ranging from 12 to 16 hours.

In some embodiments, the extrusion is performed using an extruder that comprises at least one extruder barrel, screw and feed system, a feed block (e.g., a two-layer feed block, three-layer feed block, etc.) and a die or a multi-manifold die. Each layer type will have its own extruder barrel, screw and feeder (for example, an A/B/A tri-layer film has two extruders) and there can be screen changers and melt pumps on commercial equipment. All of the extrusion materials will flow into a feed block followed by a die or a multi-manifold die. In these embodiments, the polymer blend can be extruded under conditions where the extruder that is operated at a barrel temperature ranging from 235 to 290° C., at a feed block temperature ranging from 235 to 290° C., and at a die temperature ranging from 230 to 270° C.

In some aspects, the present disclosure pertains to blister packages that include (a) a thermoformed web that has one or more thermoformed blister cavities contained therein and is formed from a polymer film that comprises a blend of amorphous polyethylene terephthalate and a copolyester as described in more detail elsewhere herein, (b) lidding applied to the thermoformed web, and (c) one or more consumable products positioned in the one or more thermoformed blister cavities and between the lidding and the thermoformed web. Examples of such consumable products include solid, semi-solid and liquid pharmaceutical dosage forms (e.g., tablets, pills, capsules, powders and syrups), tobacco products, cannabis products, consumer products (e.g., razors, toothbrushes, and pens) and food products (e.g., chewing gum, yogurt, and spreads), among others. In certain embodiments, the lidding is laid over and bonded to an area of the thermoformed web surrounding each blister cavity with a heat seal lacquer. In certain embodiments, the lidding comprises a rupturable layer such as a rupturable foil layer, one or more layers of polymers, or paper, among others, which may be scored in some cases to enhance rupturability. The lidding may also contain a burst resistant layer that provides burst security until it is removed. For example, the burst resistant layer may be a label adhered to an external surface of the rupturable layer.

In some aspects, the present disclosure pertains to medical device packages that include (a) a thermoformed web that has one or more thermoformed cavities contained therein and is formed from a polymer film that comprises a blend of amorphous polyethylene terephthalate and a copolyester as described in more detail elsewhere herein, (b) lidding applied to the thermoformed web, and (c) one or more medical devices, medical device components and/or medical device accessories positioned in the one or more thermoformed cavities and between the lidding and the thermoformed web. Examples of such medical devices include, for example, orthopedic devices, catheters, injectables, surgical kits, and inhalers, among many others. In certain embodiments, the lidding is laid over and bonded to an area of the thermoformed web surrounding each cavity with a heat seal lacquer. In certain embodiments, the lidding comprises polymeric material and/or paper. Commonly used lidding materials are those that let gases pass but not a pathogenic agent (e.g., a bacterial or viral microorganism). These materials include a spun bonded material formed from high-density polyethylene fibers (e.g., TYVEK®) and special paper grades. The porosity of these materials enables sterilization by ethylene oxide and works by penetration of this gas through the lidding. In both cases, a peelable adhesive is typically used on the lidding, which is grid coated to let the gas pass as well. Alternatively, polymeric films are also available that can be sterilized by e-beam or gamma radiation. In some cases the medical device package may be enclosed and sealed within an outer foil pouch.

In various embodiments, the present disclosure is directed to processes that comprise (a) placing a product (e.g., consumer product, medical device, medical device component, medical device accessory, etc.) in a cavity of a thermoformed web that is formed from a polymer film that comprises a blend of amorphous polyethylene terephthalate and a copolyester as described elsewhere herein, and (b) sealing a lidding to the thermoformed web. In some embodiments, the lidding is sealed to the thermoformed web at an elevated sealing temperature. For example, the lidding may be attached to the thermoformed web at a sealing temperature ranging from 110 to 210° C., for example, ranging from 110° C. to 120° C. to 130° C. to 140° C. to 150° C. to 160° C. to 170° C. to 180° C. to 190° C. to 200° C. to 210° C.

Other aspects of the present disclosure pertain to methods of recycling that comprise (a) combining (i) polyethylene terephthalate flakes and/or polyethylene terephthalate pellets and (ii) flakes of a thermoformed web that has one or more thermoformed cavities contained therein and that is formed from a polymer film that comprises a blend of amorphous polyethylene terephthalate and a copolyester as detailed elsewhere herein and/or pellets formed from such flakes of thermoformed web to form a mixture of flakes and/or pellets. In some embodiments, the mixture is crystallized at elevated temperature for a suitable time (e.g., 160 to 170° C. for 15 to 45 minutes) to form a crystallized mixture. The crystallized mixture can then be fed into further process streams. For example, the crystallized mixture may be dried and be fed into an extruder to form an extruded product (e.g., film, pellets, or strand).

Other aspects of the present disclosure pertain to recycle streams that comprise (a) recycled polyethylene terephthalate flakes and/or pellets and having admixed therewith (b) recycled flakes of a thermoformed web that has one or more thermoformed cavities contained therein and that is formed from polymer film that comprises a blend of amorphous polyethylene terephthalate and a copolyester as detailed elsewhere herein and/or pellets formed from such recycled flakes of thermoformed web.

EXAMPLES

Eight formulations were produced as described Table 1.

TABLE 1

| Sample # | Copolyester wt % | APET wt % |
|---|---|---|
| 1* | 100 | 0 |
| 2* | 0 | 100 |
| 3 | 15 | 85 |
| 4 | 20 | 80 |
| 5 | 25 | 75 |
| 6 | 30 | 70 |
| 7 | 35 | 65 |

*Neat resin used as a standard for this testing

Pellets of the copolyester include Embrace™ LV (CHDM based copolyester), Eastman™ Developmental Copolyester D39251 Natural (Eastman Chemical Company, Kingsport, TN, USA), Huahong WS-501 (NPG based copolyester) (Jiangyin Huahong Chemical Fiber Co., Ltd., Jiangsu China), Selenis HS420 (CHDM based copolyester), Selenis 80M (NPG based copolyester), Selenis HS310 (NPG based copolyester) (Compagnie Selenis Canada, Montreal, Canada), SK chemical SF 700 (CHDM based copolyester) (SK Chemicals, Bundang-gu, Seongnam-si, Gyeonggi-do, South Korea), and Yixing Guanghui HSF (NPG based copolyester) (Yixing Guanghui Package Co.,Ltd., Jiangsu, China). Pellets of the APET include DAK Laser™+C9921 (DAK Americas LLC, Chadds Ford, PA, USA), Indorama Preformance® SG08, Indorama Polyclear® PET, Indorama FuTuRe-PET®, (Indorama Ventures USA LLC, Asheboro, NC, USA), 0.80 IV Food grade APET, specifically, StarPet Performance® PET 1708 (StarPet/Indorama Ventures, Asheboro, NC, USA), and Selenis Infinite™ S 80. Pellets of copolyester and APET were blended and extruded to form three-layer films (5-10% Skin/80-90% Core/5-10% Skin, based on the overall thickness of the films), with each of the three layers having the same polymer content, but with the outer skin layers containing 1.5% mineral surface modifier. The films tested were prepared using a lab-scale coextrusion setup that included two C.W. Brabender (South Hackensack, NJ, USA) ¾" single screw extruders with an L/D of 25:1. A C.W. Brabender Intelli-Torque Plasti Corder torque rheometer was used as the drive unit on the main (core) extruder, while a C.W. Brabender ATR Plasti-Corder was used as the secondary (skin) extruder drive unit. The blend from the extruders was fed into an A/B/A feed block from C.W. Brabender which is then fed into a custom EDI® 12" fish tail flex lip sheet die from Nordson Corp. Westlake, OH, USA. The films are sent through a LabTech LCR-350-HD three roll stack (Labtech Engineering Company Ltd., Muang, Samutprakarn, Thailand) for gauge control and winding. Final thickness of the films ranged from 8 to 10 mil (203 to 305 micron).

The films were then run on an Uhlmann B 1240 blister thermoforming line (Uhlmann Pac-Systeme GmbH & Co. KG, Laupheim, Germany) to quantify the performance of each film. The post-formation transverse direction (TD) shrinkage was recorded at several temperatures to measure dimensional stability of each film.

During the thermoforming process, which is an unsupported web process, films are heated and subsequently formed into the desired shape. This heating allows for the relaxation of the imparted thermal stresses which can result in shrinkage in the transverse direction (perpendicular to unwind direction). In addition to the thermal stresses, the tension from the thermoforming line on the heated film can also cause mechanical distortion which is exhibited by all thermoformable solids. This distortion usually results in elongation in the machine direction (parallel to the unwind direction) and, consequently, shrinkage in the transverse direction. Although tension contributes to transverse direction shrinkage, there is little tension on the film prior to shrinkage measurements, therefore the main driver is the relaxation of thermal stresses. In addition to transverse direction shrinkage, film can have a bias or asymmetric shrinkage which may cause the film to shift to one side or the other when processed on a blister line. This shifting on the blister line can lead to defects in final parts and processing issues such as unformed cavities, "haloing", and misalignment between forming, sealing, and cutting stations. Additionally, if the shrinkage is great enough that the tooling cannot clamp properly none of the cavities will form, as air will escape from the areas where the film has receded due to shrinkage. In addition to asymmetrical shrinkage, a film that shrinks past the clamping area can have the same effect. This means entire rolls could be unusable if the film shows consistent asymmetric shrinkage or disproportionate shrinkage.

Figure 3:
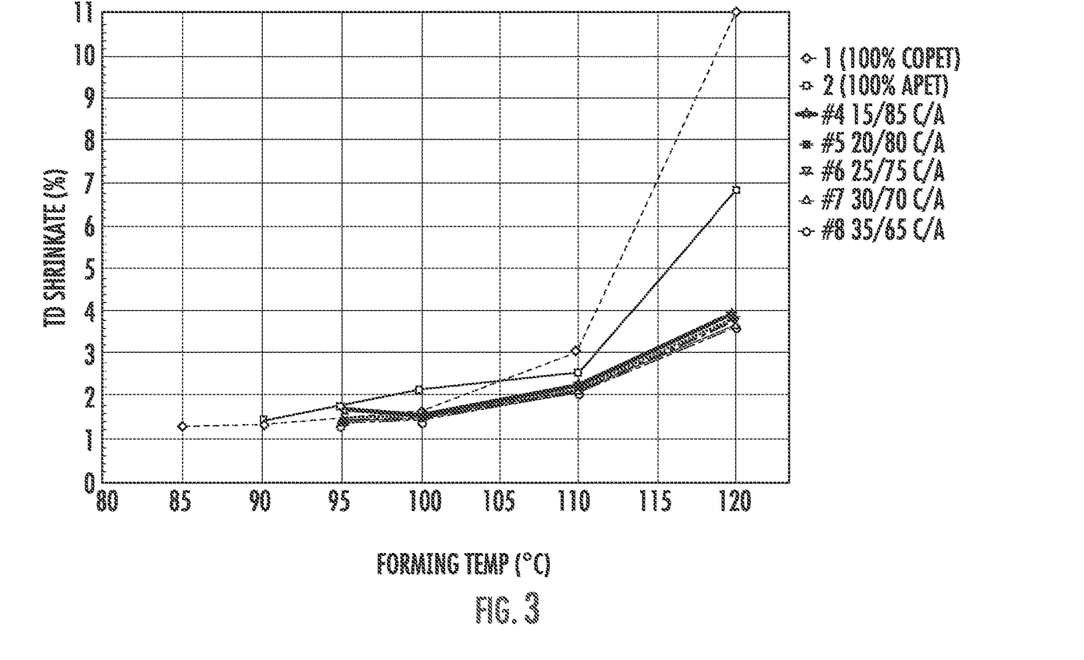
FIG. 3 is a graphical illustration of transverse direction shrinkage versus thermoforming temperature of polymer films, in accordance with several embodiments of the present disclosure.

As shown in FIG. 3, all blends exhibited an overall low shrinkage from the start of their thermoforming window up to a temperature of 110° C. Generally, in the development work, a shrinkage of greater than 4% causes issues on the Uhlmann B 1240 blister thermoforming line, making it unable to consistently produce blister cards, although this shrinkage value will greatly vary across lines (size, manufacturer, etc.). The average thermoforming window exhibited by the samples in this study was 90 to 120° C. For comparison, a standard PVC film (Pentapharm® PH-M570/01 at 250 microns, Klockner Pentaplast Group, London, England) would possess a typical thermoforming window of approximately 110 to 130° C.

All experimental sample thermoforming windows were ultimately reduced due to the film sticking to the mold or the contact heater at the upper end of the window. In addition to sticking, almost all samples exhibited scalloping (increased shrinkage in the center of an index, but not at the ends) at or above 120° C. It was noted that, in all blended samples, the thermoforming window was shifted upward relative to the pure APET and the pure copolyester samples. The pure (neat) resin samples were not able to be run above 110° C., while the blended samples remained stable (<4% shrinkage) to 120° C. This puts the resin mixtures closer to the standard PVC thermoforming window (approximately 110° C. to 130° C.).

Tensile testing is used to measure the strength, toughness, and elongation of a material. These physical properties provide insight into a material's performance for numerous applications. For thermoforming packaging films, tensile properties may give insight to rigidity of the formed cavity and cuttability of the film. Materials that tend to have higher yield strength will tend to form more rigid cavities, because the force required to deform them is higher whereas materials that exhibit greater elongation will be more difficult to cut due to their tendency to deform before failing, resulting in a poor cut and increased blade wear, though these tendencies may have exceptions.

Figure 4:
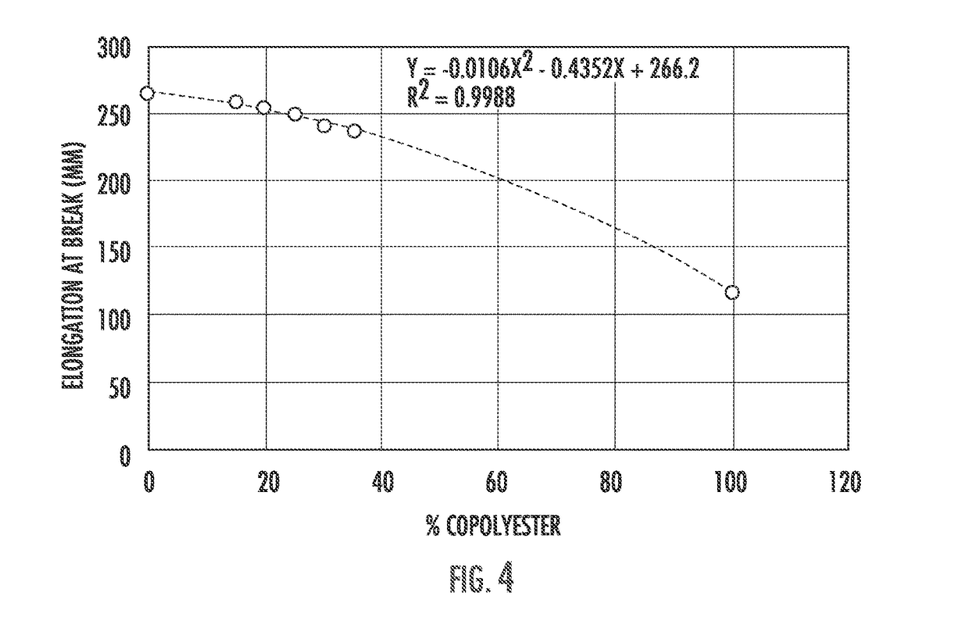
FIG. 4 is a graphical illustration of elongation at break versus polymer film composition, in accordance with several embodiments of the present disclosure.

The elongation at break test method (ASTM D-638) was used in an effort to correlate the elasticity of the polymer matrix to the relative toughness as pertains to cut propagation, with results shown in FIG. 4. It is hypothesized that notch sensitivity will also play a crucial role in this value, as in the absence of notch sensitivity, the blade will require more force to cut through the matrix. Moreover, with minimal crack propagation due to the lack of notch sensitivity in APET materials, the cutting implement will face a longer path under load for the same thickness of matrix when compared with a notch sensitive material. It has been found that the crosshead plays a large role in the results, with the fastest setting (500 mm/min) outlined in the ASTM standard producing the most discernible difference between the samples. The tensile testing shows that pure APET exhibits significantly greater toughness than pure copolyester or any of the copolyester/APET blends which may explain the difficulty typically experienced while cutting APET. Although the increased toughness of APET is expected, the toughness of the copolyester/APET blends may have been reduced due to the shear experienced by the blends during the compounding process.

Differential Scanning calorimetry (DSC) is used to measure thermodynamic transitions such as glass transition temperature (Tg), crystallization temperature (Tc), and melting temperature (Tm). Each of these three temperatures measured using DSC plays a role in polymer processing and recycling.

The glass transition temperature is the temperature at which the free volume between the polymer chains increases to the point that the polymer matrix allows the polymer chains to oscillate, with the volume of atoms being independent of temperature. From a practical standpoint, the glass transition temperature is the temperature at which amorphous regions of a polymer soften and are easily deformed. This softening caused by the glass transition signifies the start of the thermoforming range in amorphous polymers, including polyethylene-terephthalate-based polymers (PET-based polymers). A polymer with a lower Tg is able to be thermoformed at lower temperatures which may lead to benefits during thermoforming such as shorter cycle times resulting from shorter heating times and lower energy costs due to the decreased heating requirements.

The melting temperature of a PET-based polymer is the temperature at which the crystal domains melt, and the solid material becomes a liquid. The melting temperature of the PET-based polymer influences various processes, including extrusion, compounding, drying, and recycling. The melt temperature is so important to the recycling process that the acceptable range of melting temperatures (225-255° C.) for a PET-based polymer to be labeled as a RIC #1 material is specified by law in the state of California.

Figure 5:
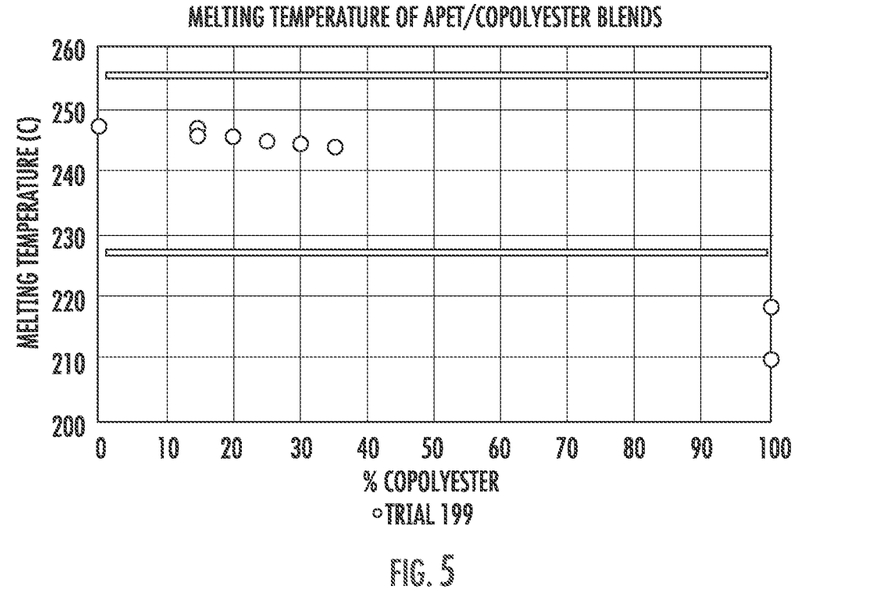
FIG. 5 is a graphical illustration of melting temperature versus polymer film composition, in accordance with several embodiments of the present disclosure.

As shown in FIG. 5, the melting temperature of the PET blends tend to decrease as the copolyester content increases. FIG. 5 also shows that 100% copolyester film does not fall within the specified melting temperature range requirements to be labeled with a RIC #1 in the state of California (i.e., 225 to 255° C., which is denoted by the horizontal lines in FIG. 5). Although 100% copolyester resin does not fall within the required melting range for recyclability, the blends of APET and copolyester appear to show a singular melting peak within the temperature range required for recyclability.

It is useful to know the crystallization temperature for PET-based polymers processing due to the distinct differences in properties that PET-based polymers show before and after crystallization. When PET-based polymers crystallize, the temperature resistance of the polymer matrix significantly increases due to the stability of the crystalline regions. The stability of the crystalline regions allows for shorter drying times because of the high temperatures that PET can withstand in its crystalline phases without deforming or forming large agglomerations in the dryer. The temperature stability of the PET-based polymer crystals also influences thermoforming performance since the crystallization temperature can be thought of as the end of the thermoforming range. Crystalline polymers generally become too rigid to be formed at typical thermoforming temperatures. An increase in crystallization temperature of the resin blends improves the thermoforming and extrusion windows by helping to keep the film in the amorphous state, which is desired for thermoforming applications and also for aesthetic reasons.

Figure 6:
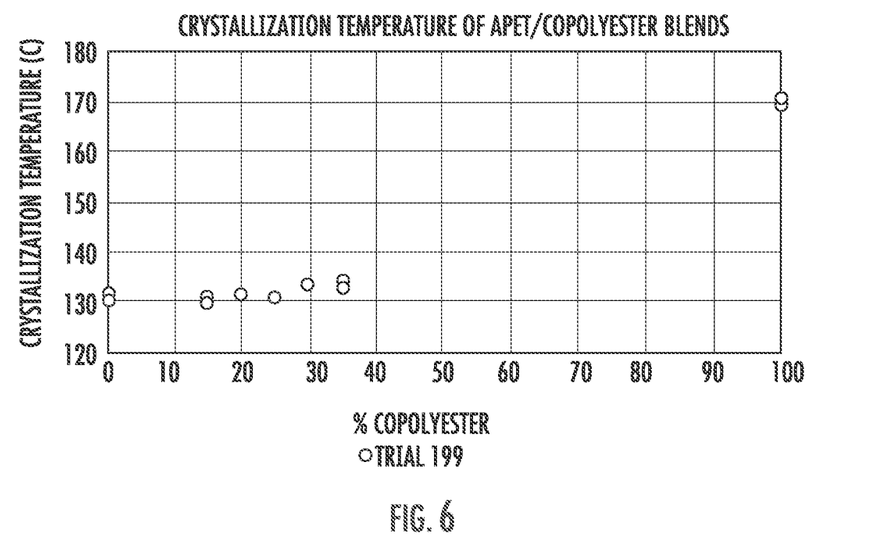
FIG. 6 is a graphical illustration of crystallization temperature versus polymer film composition, in accordance with several embodiments of the present disclosure.

In FIG. 6, the crystallization temperatures measured using DSC while heating are shown for various blends of copolyester and APET. The crystallization temperatures while heating tend to increase with increasing copolyester content (although not shown, it is further noted that the crystallization temperature measured as the resin is cooled from the melt tends to decrease with copolyester content). The differences in the crystallization temperatures between the copolyester/APET blends show that APET will more readily crystallize regardless of whether the resin is being crystallized by being heated in a solid state or by cooling from a molten state. These crystallization trends also show that the blends with higher copolyester loading levels have a greater propensity towards being in an amorphous phase than blends with higher APET loadings.

Figure 7:
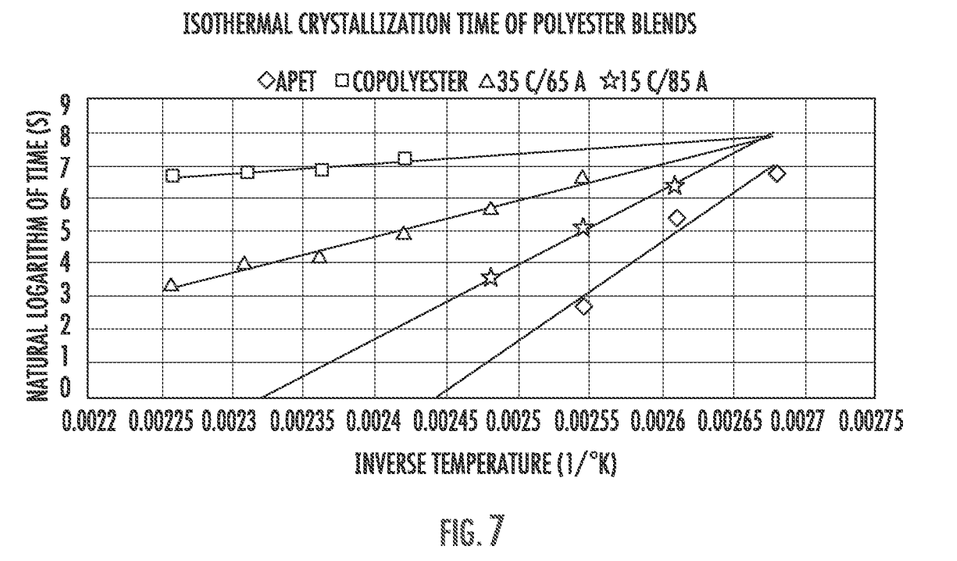
FIG. 7 is a graphical illustration of natural logarithm of crystallization time versus inverse isotheral crystallization temperature for several film compositions, in accordance with embodiments of the present disclosure.

FIG. 7 show isothermal crystallization data for the following polymer films: (a) a neat copolyester film, (b) a neat APET film, (c) a 15/85 copolyester/APET film, and (d) a 35/65 copolyester/APET film. All films were produced on commercial equipment having an A/B/A layout with two extruders and accompanying auxiliary equipment (dryers, feeders, hoppers, etc.), along with melt pumps and screen packs for each extruder which flow into a feed block and die, followed by a roll stack and a take-off roll.

The crystallization rates of the films were measured through heat flow into the polymer using DSC. The crystallization times recorded are the time at which each sample reaches its peak crystallization rate (measured by heat flow into the polymer) at a given temperature. As shown by FIG. 7, the relationship between crystallization time and temperature follows the Arrhenius equation with the inverse of temperature being linear with logarithm of crystallization time. Additionally FIG. 7 also shows that crystallization time increases as copolyester content increases for all temperatures tested. This relationship between copolyester content and crystallization time shows that the crystallization time may be tailored to specific applications through the modification of copolyester content in the blend.

Figure 8:
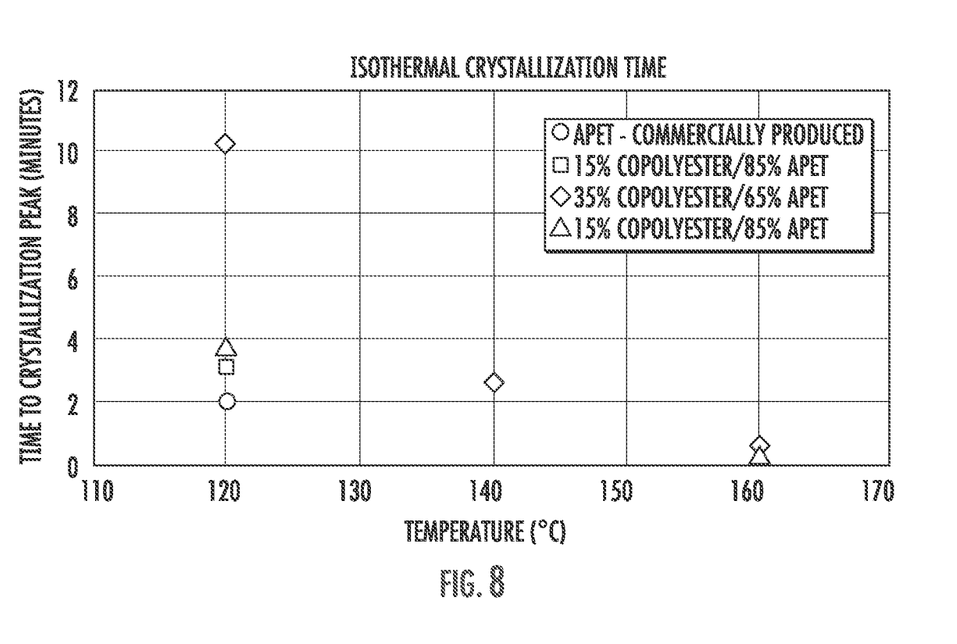
FIG. 8 is a graphical illustration of isothermal crystallization rates of a standard APET as compared to various iterations of the invention described herein at a range of temperatures. As a note, some of the samples are not assessed at elevated temperature as they crystallized prior to the recorded portion of the test.

Additionally, FIG. 8 shows the isothermal crystallization delay, as tested by DSC, present with various samples at differing temperatures. FIG. 8 show isothermal crystallization data for the following polymer films: (a) a neat APET film, (b) a 15/85 copolyester/APET film formed in a first extrusion run, (c) an additional 15/85 copolyester/APET film formed in a second extrusion run, and (d) a 35/65 copolyester/APET film. All films were formed on commercial equipment having an A/B/A layout with two extruders and accompanying auxiliary equipment (dryers, feeders, hoppers, etc.), along with melt pumps and screen packs for each extruder which flow into a feed block and die, followed by a roll stack and a take-off roll.

Of particular note are the results at 120° C., as this is similar to the processing conditions temperatures observed on a thermoforming line. The standard APET material crystallizes in approximately 2 minutes, while the samples produced with the invention provide approximately a 4 to 10 minute crystallization time. This additional crystallization over a standard APET material greatly aids in the processability and ease of use of the novel polymeric film. One item of note, the second 15% Copolyester/85% APET sample (triangle marker) was not tested at 140° C. Other samples that are not present on the figure crystallized during the equilibration portion of the test method and therefore do not have measured values.

While crystallization delay is beneficial, there is an upper limit to the viability. The APR PET Flake Clumping Evaluation (APR Doc. #PET-S-08) specifies a crystallization procedure consisting of a 30 minute hold at 165° C. The materials must crystallize in this timeframe or will have a high likelihood to fail the clumping evaluation.

Also, without wishing to be bound by theory, it is believed that the addition of the copolyester kinetically slows the crystallization process, due to increasing the necessary free volume for the chains to orient in the appropriate crystal lattice, which requires additional heat to achieve.

The crystallization rate is a non-trivial component of thermoforming thicker (>508 micron) films as well as sealing for all crystallizable polyester film thicknesses. This is related to the inherent low thermal conductivity present in the polymer matrix. The low thermal conductivity forces more energy to be introduced on the surface of the film in order to create a material uniformly above the glass transition temperature, especially within the cycle time constraints present in the industry. This can lead to crystallization with associated undesirable changes in visual and physical properties. A lower thermal load on the matrix would provide a more uniform temperature across the matrix but would require exponentially more time. Likewise, sealing is typically conducted at temperatures in excess of the crystallization point of the films and can cause similar visual and physical property issues. Crystallization issues can also occur during changeover or stoppages in the thermoforming which are detrimental to line performance across the array of film thicknesses as well.

Thus, as shown by the DSC testing, the copolyester/APET blends exhibit a balance of thermal properties and are more useful for certain applications, than the properties of the neat copolyester or neat APET resins. The slower crystallization rates of the copolyester/APET blends improves the thermoforming and extrusion windows by helping to keep the film in the amorphous state which, as noted above, is desired for thermoforming applications and also for aesthetic reasons. The slower crystallization rates improve the crystallization properties by delaying the crystallization and allowing more freedom in the operating window, especially in thicker samples (for example, medical device packaging). Films in accordance with the present disclosure have been produced that have a 10 minute or greater crystallization time at a temperature of 120° C. for the 35/65 copolyester/APET film and a 2.5 or greater minute crystallization time at a temperature of 120° C. for the 15/85 copolyester/APET film. Crystallization time for pure APET at this temperature is 2 minutes.

In addition, while increasing copolyester content improves the crystallization properties of APET (slower crystallization is desirable from a thermoforming and sealing standpoint), increasing copolyester content also decreases the melting temperature. Given that the melting temperature of APET is defined as between 225 and 255° C. by the state of California, the DSC shows that the melting point of 100% copolyester resin would not meet the melting temperature requirements defined by California, but blends of APET and copolyester can meet these requirements.

Recyclability is also an important property of a material. It is becoming more common to solid state washed PET-based polymer flake prior to extrusion, rather than the more traditional method of solid stating pelletized PET-based polymer. In solid stating of washed PET-based polymer flake, the polymer flake can be exposed to heat of over 190° C. up to 220° C., as well as pressure in a loaded hopper. It is important that the polymer flakes do not stick together to form hard clumps when exposed to high temperatures and compaction. Clumps of polymer flakes can cause bridging in feed systems that prevent material flow.

Recyclability testing was completed on a sample of the invention by a test lab with experience in the methods prescribed by the Association of Plastics Recyclers (APR) Critical Guidance Protocol for Clear PET Resin and Molded Articles (APR Document Number PET-CG-01). The sample passed all required evaluations including: PET Flake Clump Screening (APR Doc. #PET-S-08), IV Loss (ASTM D4603), Fuming Sticking, Hazard Evaluation (APR Doc. #PET-P-06) IV Build Screening (APR Doc. #PET-S-07), Melting Point (ASTM D3418), Stick and Residue (APR Doc. #PET-P-06), and Plaque Color Screening (APR Doc. #PET-S-09).

All samples submitted to the third party lab for recyclability testing were produced on commercial extrusion systems and slit to the appropriate width for thermoforming. Samples were thermoformed on an Uhlmann B1240 unsupported web thermoforming machine using a standard tooling (Type 1 tablet) at standard processing conditions.

Examples of implementations of the invention described herein are for purposes of illustration only and are not to be taken as limiting the scope of the invention in any way. The scope of the invention is set forth in the following claims.

We claim:

1. A thermoformed article comprising a polymer film and having one or more thermoformed cavities contained therein, wherein the polymer film comprises a polymer blend of 50 wt % to 95 wt % of amorphous polyethylene terephthalate (APET) and 5 wt % to 50 wt % of a copolyester that comprises (a) dicarboxylic acid residues comprising polyethylene terephthalate residues and (b) diol residues comprising (i) ethylene glycol residues and (ii) one or more additional diol monomer residues selected from neopentyl glycol residues, 1,4-cyclohexanedimethanol residues, or diethylene glycol residues, wherein the polymer film exhibits a crystallization time at 120° C. of at least 2.5 minutes as measured by differential scanning calorimetry (DSC).

2. The thermoformed article of claim 1, wherein the dicarboxylic acid residues comprise 70 mol % or more of terephthalic acid residues.

3. The thermoformed article of claim 1, wherein the diol residues comprise 70 mol % or more of ethylene glycol residues.

4. The thermoformed article of claim 1, wherein the diol residues comprise up to 30 mol % of the additional diol monomer residues.

5. The thermoformed article of claim 1, wherein the polymer film has a crystallization time of not more than 30 minutes at an isothermal crystallization temperature of 165° C. as measured by DSC.

6. The thermoformed article of claim 1, wherein the copolyester and the APET are miscible and the blend is homogeneous.

7. The thermoformed article of claim 1, wherein the polymer film comprises a core layer disposed between two outer skin layers, wherein the core layer and the skin layers contain the polymer blend, and wherein the skin layers comprise a mineral surface modifier.

8. The thermoformed article of claim 1, wherein the polymer film defines top and bottom surfaces of the thermoformed article.

9. The thermoformed article of claim 1, wherein the polymer film exhibits a shrinkage of less than 4% at temperatures up to 120° C.

10. The thermoformed article of claim 1, wherein the polymer film has a melting point ranging from 225 to 255° C.

11. The thermoformed article of claim 1, wherein the polymer film has a glass transition temperature ranging from 65 to 90° C. as measured by DSC.

12. The thermoformed article of claim 1, wherein the polymer film ranges from 25 microns to 2000 microns in thickness.

13. The thermoformed article of claim 1, wherein the polymer film has an elongation at break ranging from 200 to 350% as measured by ASTM D-638.

14. The thermoformed article of claim 1, wherein the polymer film is a calendared polymer film.

15. The thermoformed article of claim 1, wherein the thermoformed article meets the clumping criteria set forth in Association of Plastic Recyclers (APR) Document Code PET-S-08, or wherein the thermoformed article meets the criteria specified by the Association of Plastics Recyclers (APR) Critical Guidance Protocol for Clear PET Resin and Molded Articles (APR Protocol PET-CG-01).

16. A packaged product comprising (a) the thermoformed article of claim 1, (b) lidding applied to the thermoformed article, and (c) one or more products positioned in the one or more thermoformed cavities and between the lidding and the thermoformed article.

17. The packaged product of claim 16, wherein the one or more products are consumable products.

18. The packaged product of claim 16, wherein the lidding comprises a rupturable layer and a burst resistant layer that can be removed from the rupturable layer, a rupturable layer that can be opened by pressure on an opposite side of the packaged product, or a peelable layer that can be removed from the thermoformed article giving access to the one or more products.

19. The packaged product of claim 16, wherein the one or more products comprise a medical device, a food product, or a consumer product.

20. The packaged product of claim 16, wherein the lidding comprises a polymer and/or paper.

21. A recycle stream comprising (a) recycled polyethylene terephthalate flakes and/or pellets and (b) recycled flakes of a thermoformed article in accordance with claim 1 and/or pellets formed from flakes of a thermoformed article in accordance with claim 1.

* * * * *